(12) United States Patent  (10) Patent No.: US 7,445,129 B2
Lin  (45) Date of Patent: Nov. 4, 2008

(54) HOLDING DEVICE FOR HOLDING TUBULAR ITEMS

(76) Inventor: Jui-Chin Lin, No. 4, Lane 390, Jhongshan Rd., Shalu Township., Taichung Hsien (TW)

( * ) Notice: Subject to any disclaimer, the term of this patent is extended or adjusted under 35 U.S.C. 154(b) by 243 days.

(21) Appl. No.: 11/373,197

(22) Filed: Mar. 13, 2006

(65) Prior Publication Data

US 2006/0151405 A1  Jul. 13, 2006

Related U.S. Application Data

(63) Continuation-in-part of application No. 10/944,729, filed on Sep. 21, 2004, now abandoned.

(51) Int. Cl.
*A47F 7/00* (2006.01)
(52) U.S. Cl. .................... 211/70.6; 211/60.1
(58) Field of Classification Search ............... 211/60.1, 211/70.6, 65.66, 87.01
See application file for complete search history.

(56) References Cited

U.S. PATENT DOCUMENTS

| 1,291,430 | A | * | 1/1919 | Davenport | ............... 211/8 |
|---|---|---|---|---|---|
| 4,932,625 | A | * | 6/1990 | Hotchkiss, Jr. | ............ 248/316.7 |
| 5,165,629 | A | * | 11/1992 | Breveglieri | ................. 248/110 |
| 5,269,328 | A | * | 12/1993 | Gasparics | ................ 131/240.1 |
| 5,342,010 | A | * | 8/1994 | Huang | ...................... 248/316.3 |
| 6,156,275 | A | * | 12/2000 | Dumitrescu et al. | ......... 422/104 |
| 6,595,376 | B1 | * | 7/2003 | Lin | ............................ 211/70.6 |
| 7,000,785 | B2 | * | 2/2006 | Jafari et al. | .................... 211/74 |

* cited by examiner

*Primary Examiner*—Meredith C. Petravick
*Assistant Examiner*—Candace L. Bradfor
(74) *Attorney, Agent, or Firm*—Rosenberg, Klei & Lee

(57) ABSTRACT

A holding device includes a base including a first protrusion and a second protrusion with a receiving space defined between the two protrusions. The first protrusion has a hole defined in an inside thereof and a clamping member is eccentrically received in the first protrusion so that a friction portion of the clamping member is movably extended through the hole and protrudes into the receiving space. A shank of a tool is received in the receiving space and clamped by the clamping member and a friction plate on the second protrusion. A cover is received in the first protrusion from an open rear end of the base so as to prevent foreign objects from entering the first protrusion.

9 Claims, 13 Drawing Sheets

HOLDING DEVICE FOR HOLDING TUBULAR ITEMS

FIELD OF THE INVENTION

The present invention relates to a Continuation-In-Part application of U.S. patent application Ser. No. 10/944,729, filed on Sep. 21, 2004 now abandoned.

BACKGROUND OF THE INVENTION

A conventional holding device 60 for holding shanks of tools is disclosed in FIGS. 12 and 13, and generally includes a base 63 with a plurality of protrusions and the shank of a tool is held in the space 631 between the two adjacent protrusions 63. A plate 61 is installed to an inside of each of the protrusions except for the last one protrusion at the right end of the base 63, and a clamping member 611 having a toothed outer periphery is connected to an inclined section of the plate 61. The clamping member 611 is extended out from an elongate hole in the protrusion as shown. A rectangular friction plate is connected to each of the protrusion except for the first one protrusion on the left of the base 60, the friction plate faces the clamping member 611. The shank can be clamped between the clamping member 611 and the friction member.

Another conventional holding device known to applicant is disclosed in FIG. 14 and includes a base 70 with a plurality of protrusions 73 and the shank of a tool is held in the space 731 between the two adjacent protrusions 73. A plate 71 having an upright section 713 and an inclined section 711 is installed to an inside of each of the protrusions 73 except for the last one protrusion at the right end of the base 73, and a clamping member 72 having a toothed outer periphery is connected to the inclined section 711 of the plate 61 by connecting two wires 721 fixed on the clamping member 72 to the two slits 712 in the inclined section 711. The clamping member 72 is extended out from an elongate hole in the protrusion 73. A rectangular friction plate is connected to each of the protrusion 73 except for the first one protrusion 73 on the left of the base 70. The friction plate faces the clamping member 72. The shank can be clamped between the clamping member 72 and the friction member.

The structure of both two conventional holding devices is complicated and each part of the two conventional holding devices has to be made by specific machine and this makes the holding device be expensive which is not competitive in the market.

The present invention intends to provide a holding device having simple structure and able to hold shanks of tools of different sizes.

SUMMARY OF THE INVENTION

The present invention relates to a holding device which comprises a base with a first protrusion and a second protrusion and, a receiving space is defined between the protrusions. The first protrusion has a hole defined in an inside thereof and a clamping member is movably received in the first protrusion. The clamping member has a frictional portion movably extending through the hole and protrudes into the receiving space. A biasing device is connected between the clamping member and the first protrusion so that the clamping member is biased toward the hole when not in use. A positioning device is fixed on a wall and the base is fixed on the positioning device.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
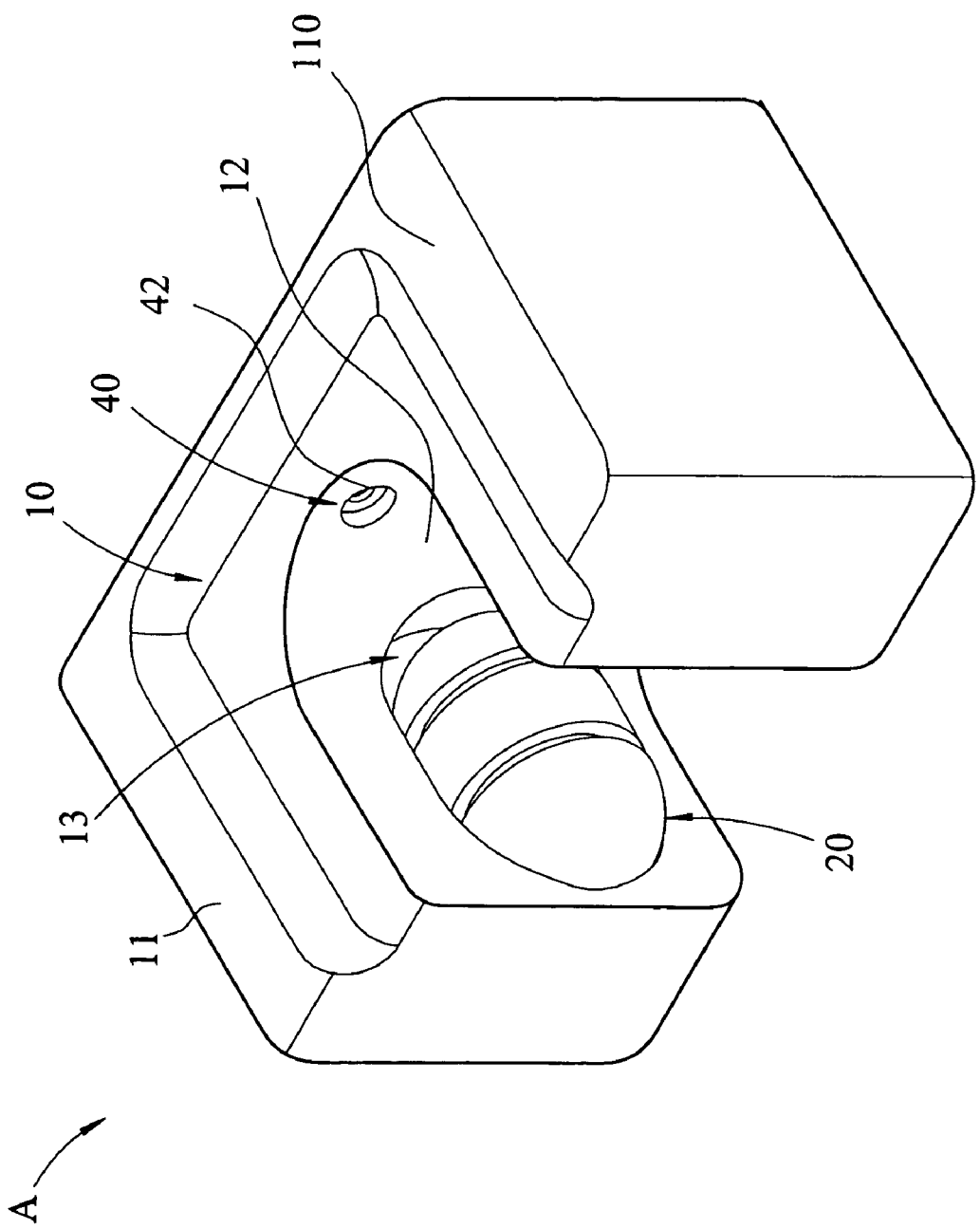
FIG. 1 is a perspective view to show the holding device of the present invention.
Figure 2:
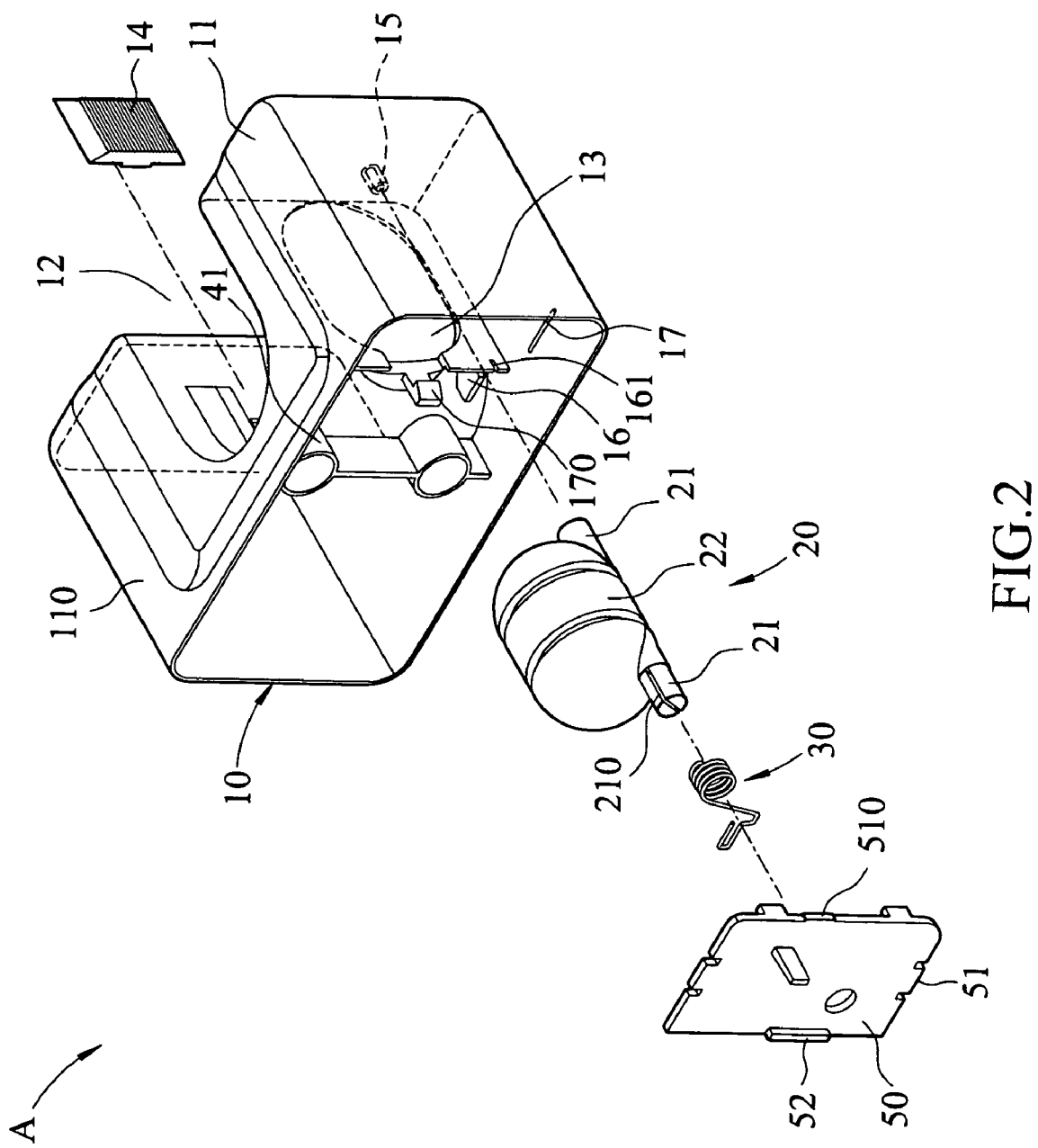
FIG. 2 is an exploded view to show the holding device of the present invention.
Figure 5:
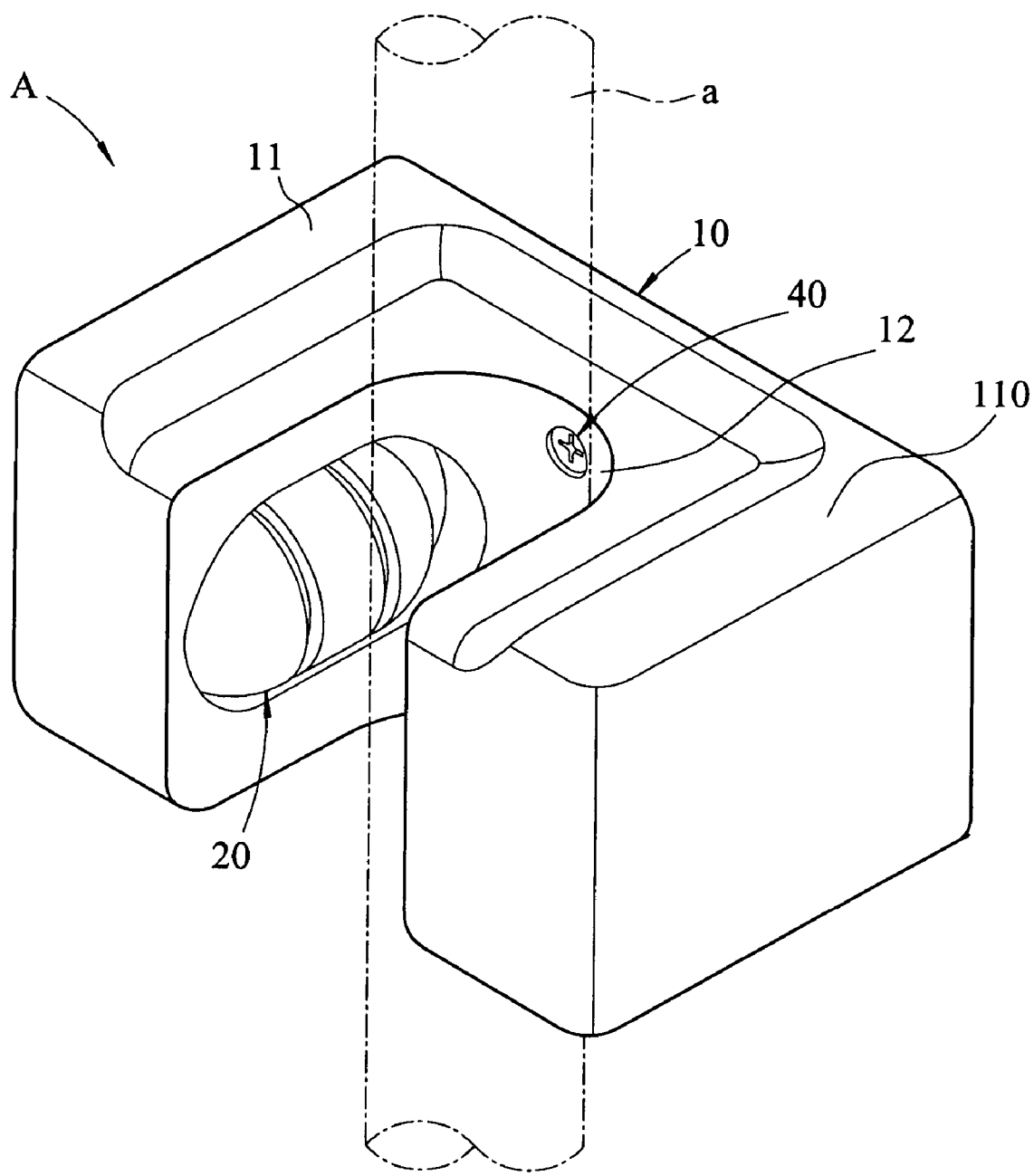
FIG. 5 is a perspective view to show that the shank is clamped by the holding device of the present invention.

Referring to FIGS. 1 and 2, the holding device "A" of the present invention comprises a U-shaped base 10 with a first protrusion 11 and a second protrusion 110 extending from a front end thereof and the rear end of the base 10 is an open rear end. A receiving space 12 is defined between the protrusions 11 and 110 so as to clamp a shank therein as shown in FIG. 5. The first protrusion 111 has a hole 13 defined in an inside thereof and a clamping member 20 is movably received in the first protrusion 11. The clamping member 20 has a frictional portion which includes a friction band 22 wrapped thereto and the friction portion movably extends through the hole 13 and protrudes into the receiving space 12 by a biasing device connected between the clamping member 20 and the first protrusion 11. Therefore, the clamping member 20 is biased toward the hole 13 when not in use. The clamping member 20 has an eccentric shaft 21 which has a first end connected to a protrusion 15 on an upright inner end of the first protrusion 11 and a second end of the eccentric shaft 21 has a slit 210. The biasing device 30 is a torsion spring 30 which has a first end of connected to the slit 210 and a second end of the torsion spring 30 is connected to a positioning stub 16 on the first protrusion 11. The positioning stub 16 is integral with a plate which has a notch 161 defined in an end thereof so that the second end of the torsion spring 30 is engaged with the notch 161 before the second end of the torsion spring 30 is connected with the stub 16. By this way, the torsion spring 30 can be well positioned. A friction plate 14 with a serrated surface is connected to an inside of the second protrusion 110 and faces the clamping member 20.

Figure 3:
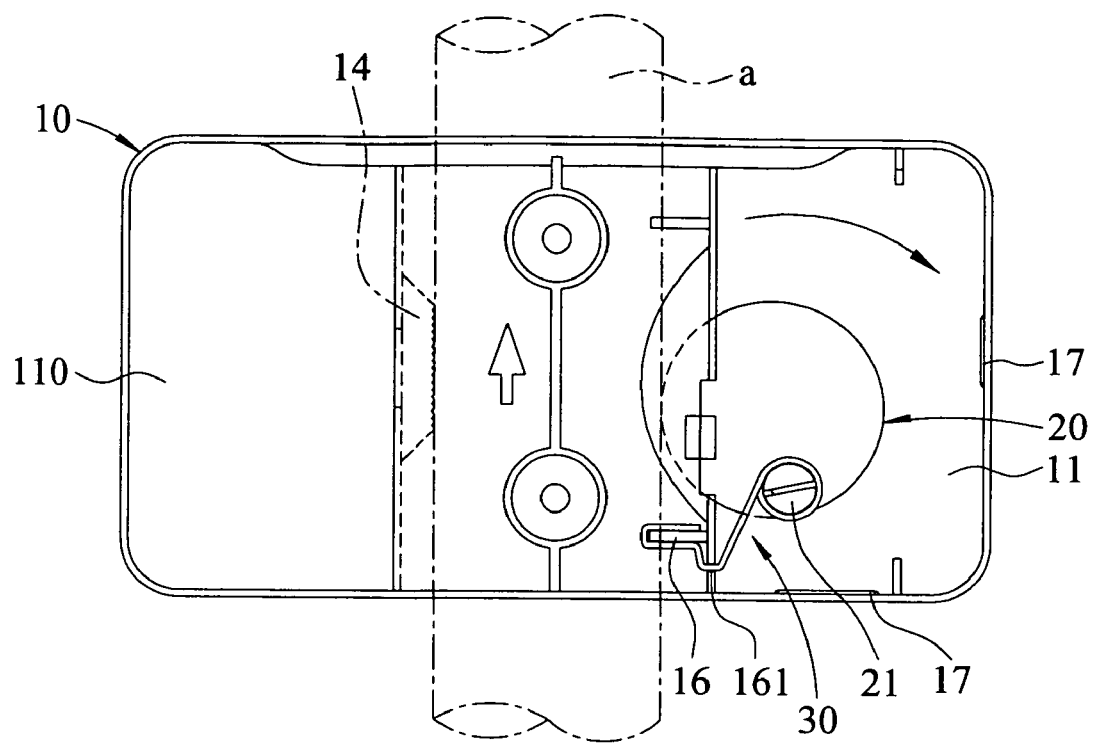
FIGS. 3 and 4 show that a shank is clamped by the holding device of the present invention from two directions.
Figure 4:
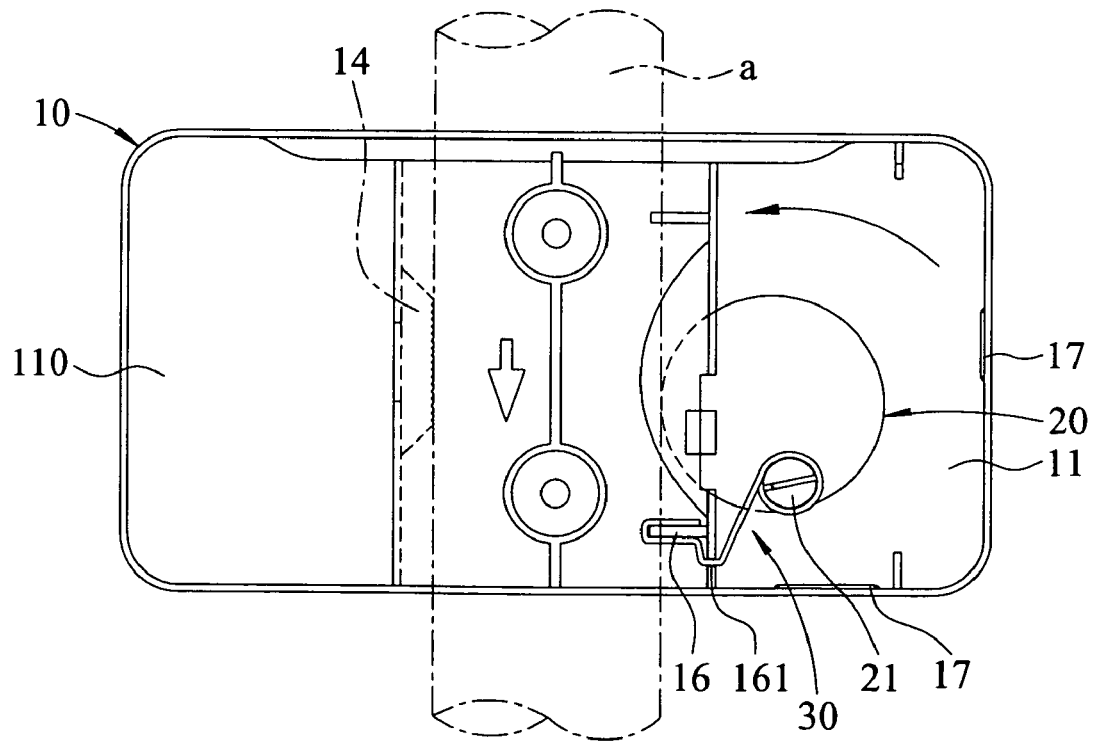

As shown in FIGS. 3 to 5, the shank "a" of a tool is inserted in the receiving space 12 from a lower end or a top end of the base 10 and the clamping member 20 is first pushed into the first protrusion 11 and the torsion spring 30 pushes the friction band 22 of the clamping member 20 to contact against the shank "a" so that the shank "a" is held between the friction band 22 and the friction plate 14. It is noted that the size of the shank "a" and the clamping positions can be different. When removing the shank "a", the user simply pull the shank "a" away from the clamping space 12, or pushes the clamping member 20 into the hole 13 and the shank is released.

A ridge 17 extends from a horizontal inside of the first protrusion 11 and a hook 170 is connected to the inside of the first protrusion 11. The hook 170 is located closes to an end of a periphery of the hole 14. A cover 50 is inserted into the first protrusion 11 from the open rear end of the base 10 and has an engaging part 51 on a lower end thereof so as to be engaged with the ridge 17. A projection 52 extends from a side of the cover 50 so as to be hooked with the hook 170. The cover 50 is used to prevent foreign objects such as dust from entering the first protrusion 11.

Figure 6:
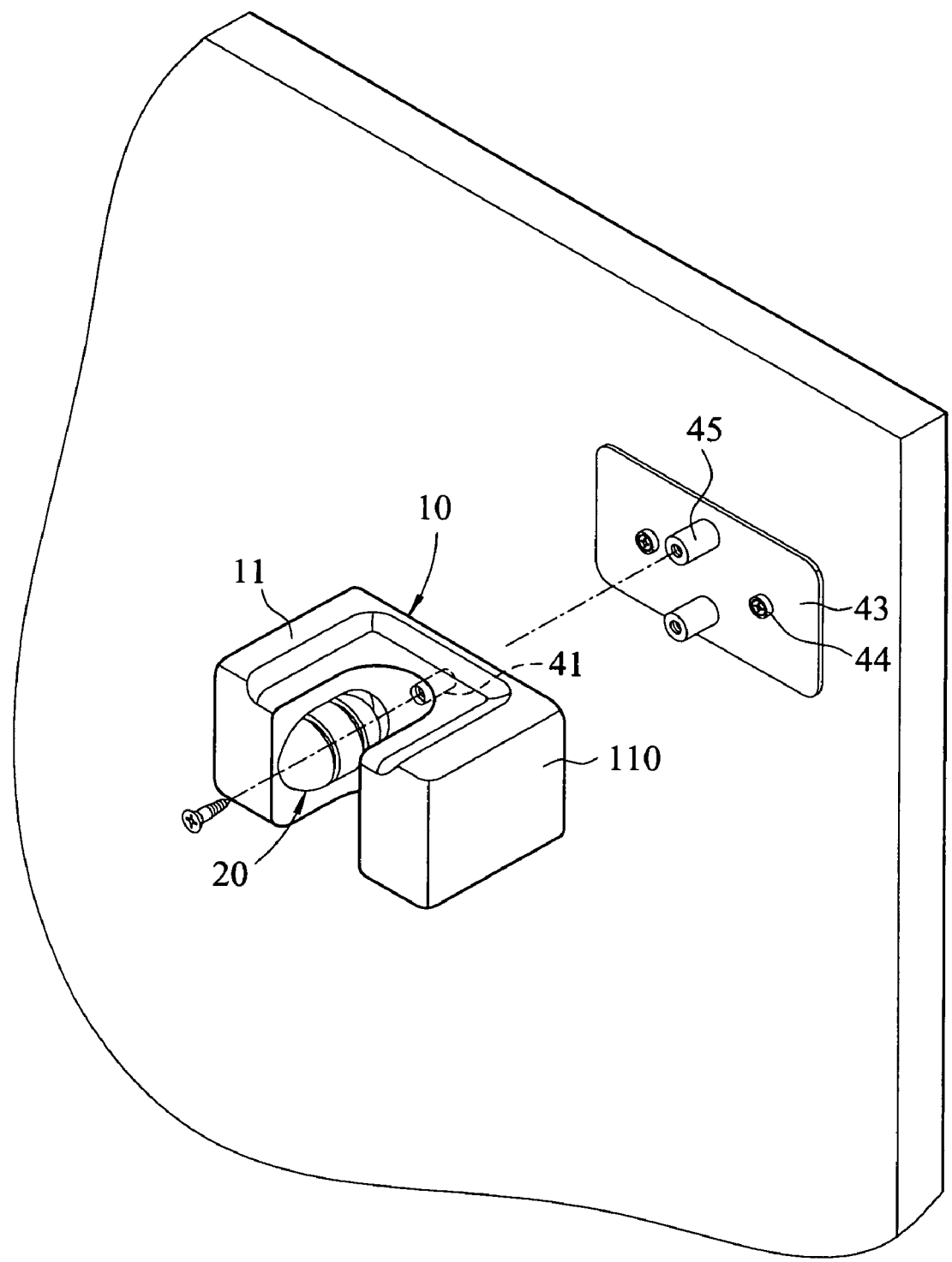
FIG. 6 shows a first embodiment of the positioning device is used to connect the holding device of the present invention on a wall.

As shown in FIG. 6, a positioning device is fixed on a wall and the base 10 can be fixed on the positioning device. The positioning device includes a positioning board 43 which is fixed on the wall by two screws 44 and two threaded reception tubes 45 extend from the positioning board 43. Two guide tubes 41 located in an open rear end of the base 10 and bolts extending through two holes 42 in the base 10, the guide tubes 41 and are connected to the reception tubes 45.

Figure 7:
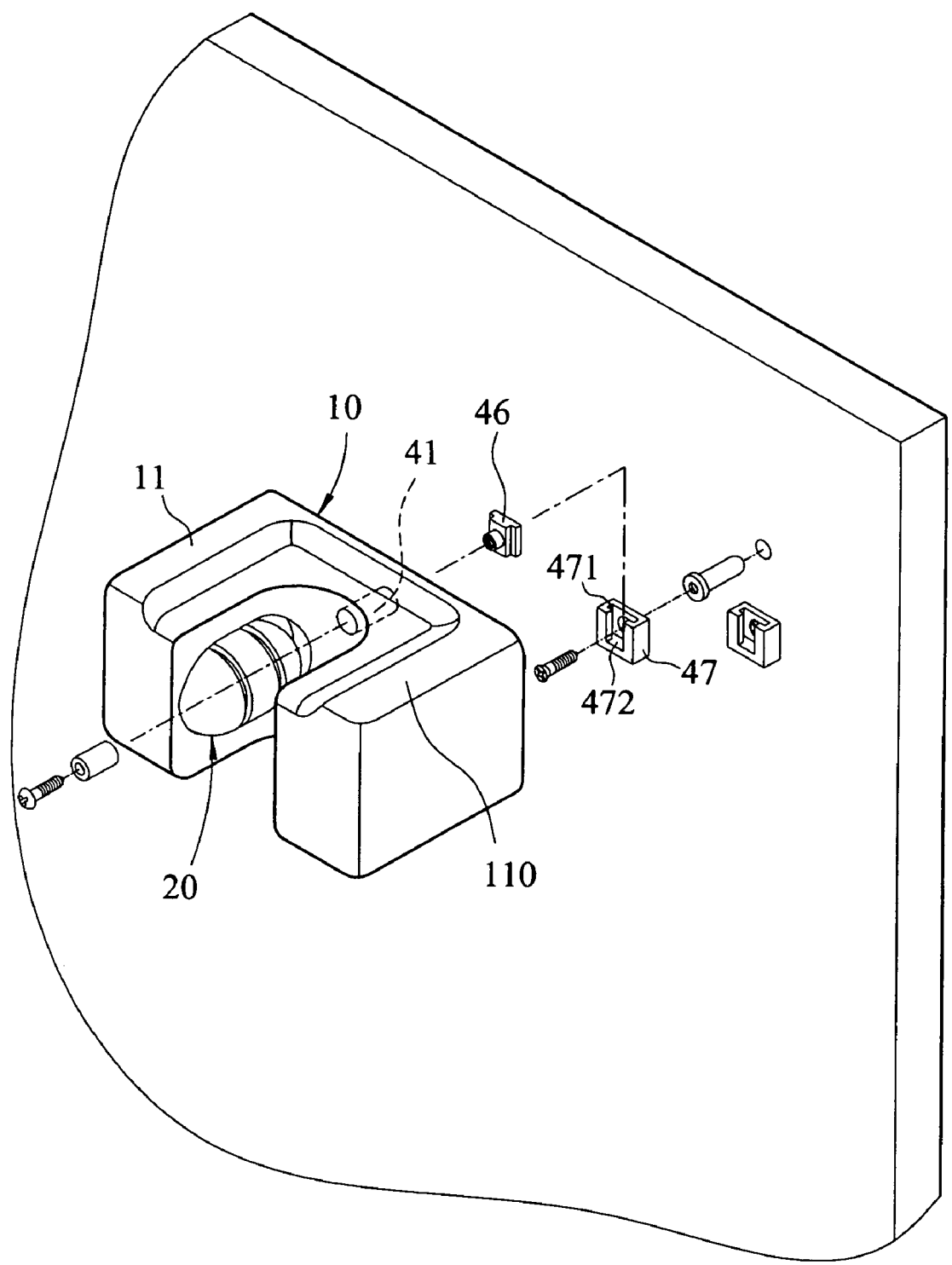
FIG. 7 shows a second embodiment of the positioning device for connecting the holding device on a wall.
Figure 8:
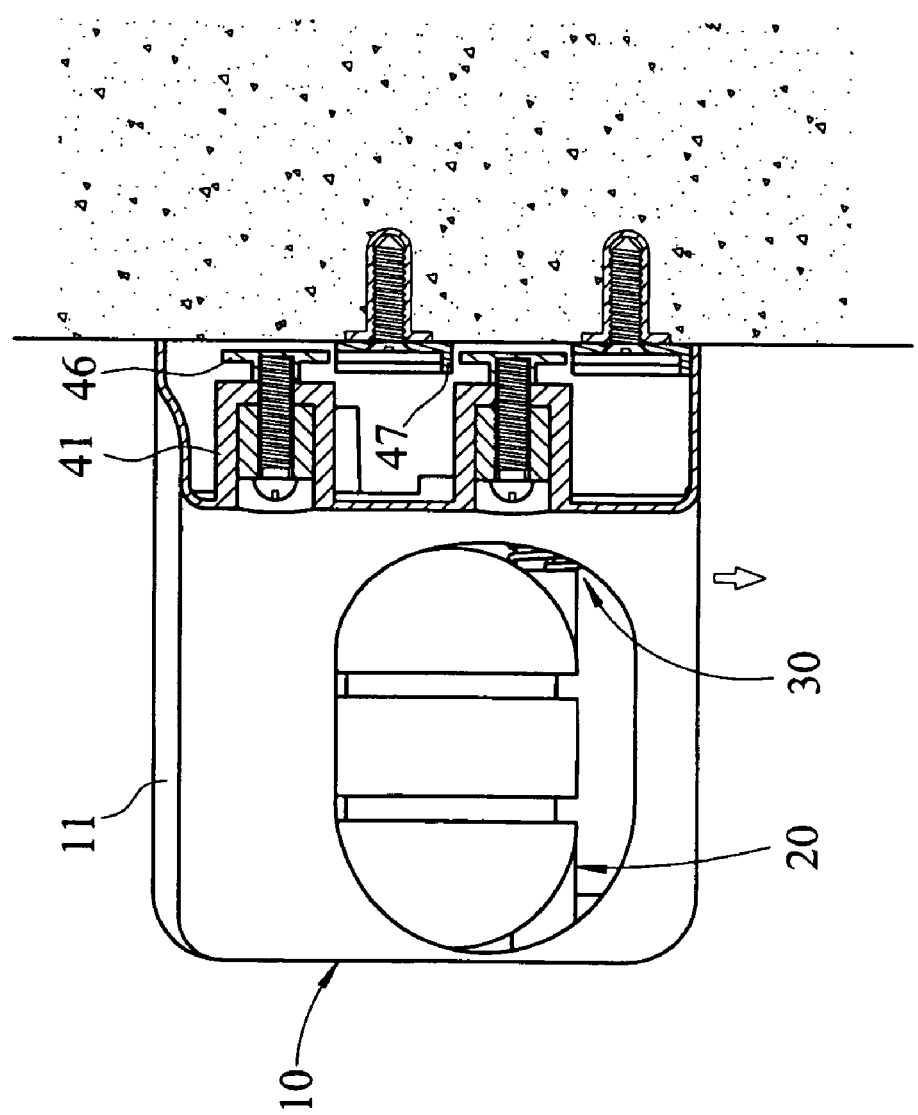
FIGS. 8 and 9 show that the steps for hanging the holding device on a wall when using the second embodiment of the positioning device.
Figure 9:
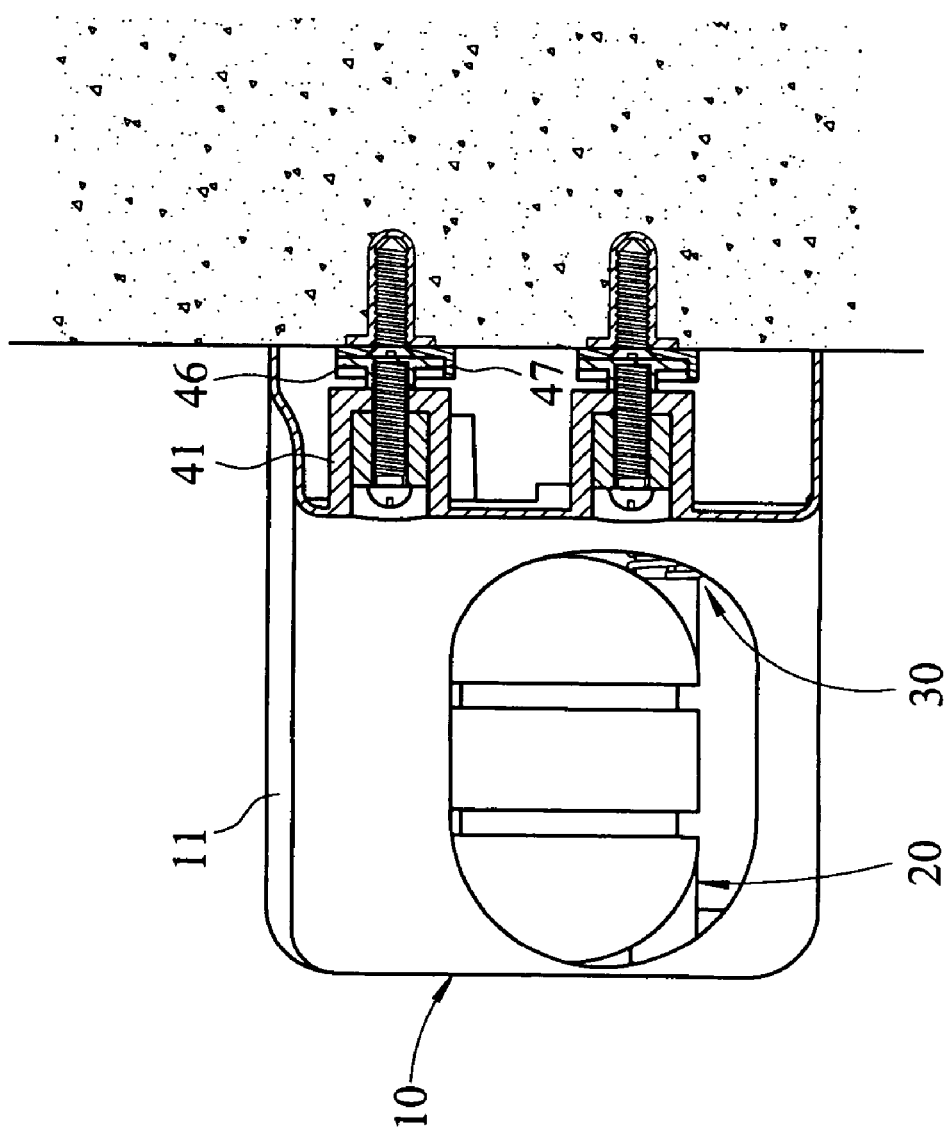

FIGS. 7 to 9 show a second embodiment of the positioning device, wherein the positioning device includes two connection plates 46 connected to the two guide tubes by the bolts, and two reception frames 47 are fixed on the wall and each reception frame 47 has a U-shaped receiving space 472 in which respective one of the two connection plates 46 is engaged.

Figure 10:
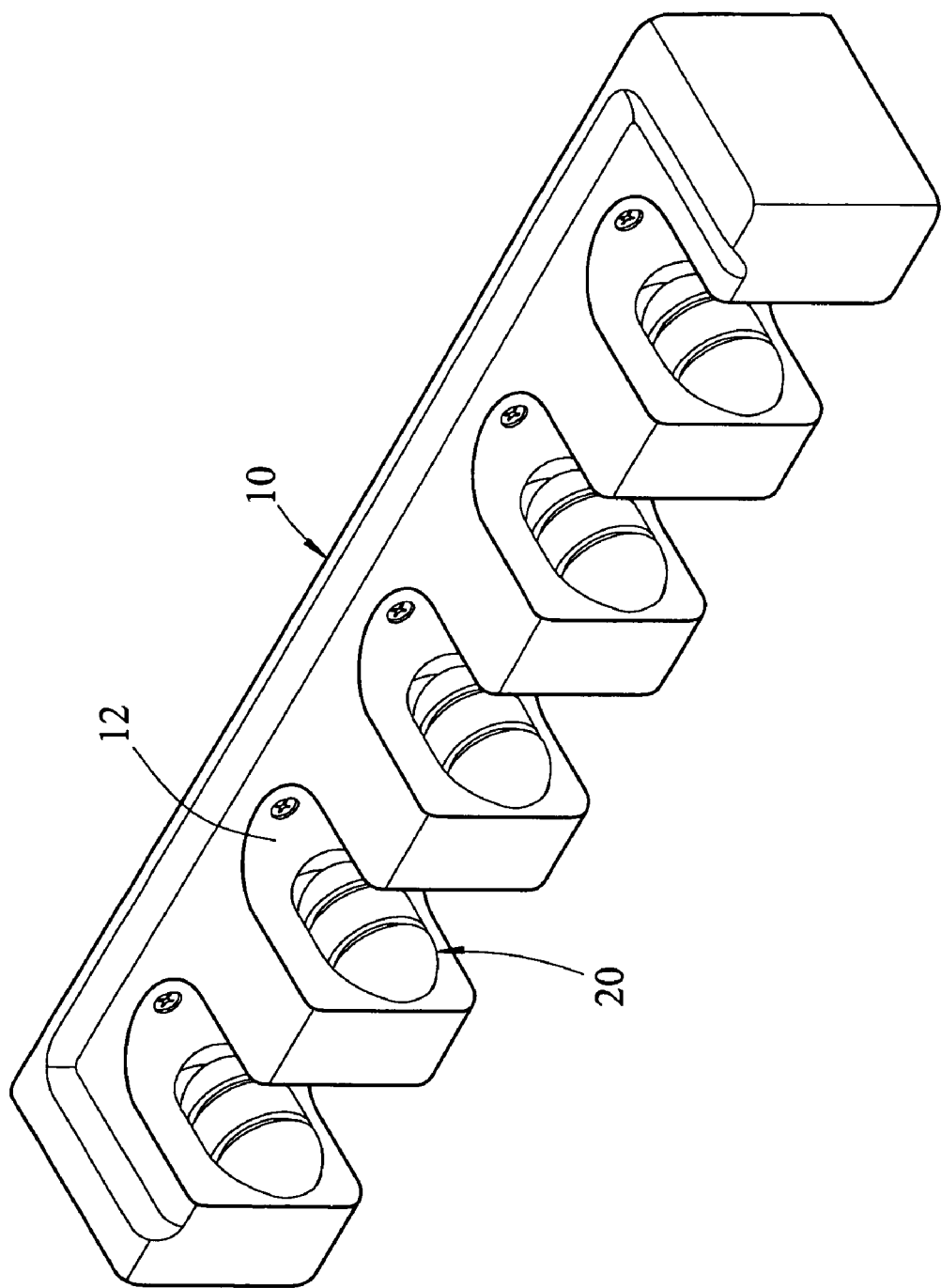
FIG. 10 shows the number of clamping members of the holding device can be multiple.
Figure 11:
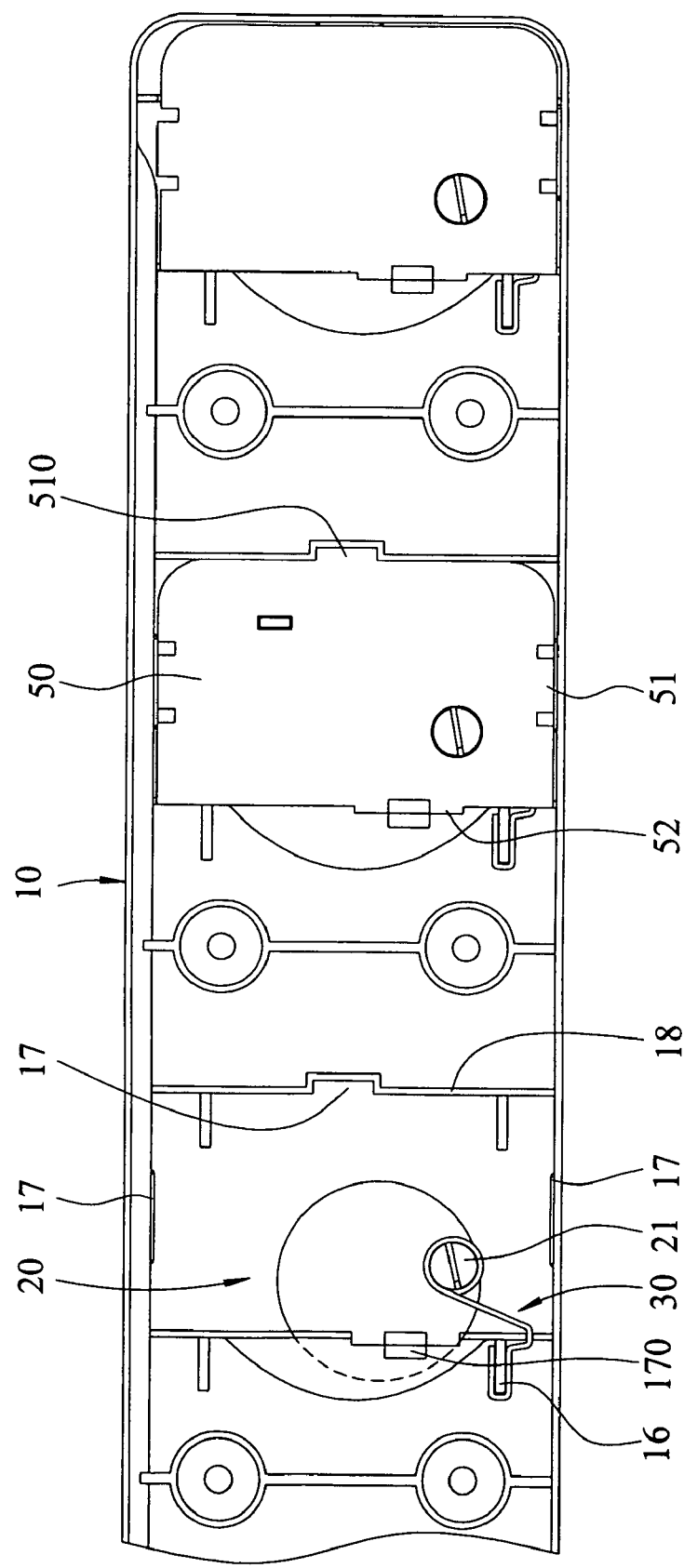
FIG. 11 shows a plurality of covers are engaged with the protrusion in the holding device in FIG. 10.
Figure 12:
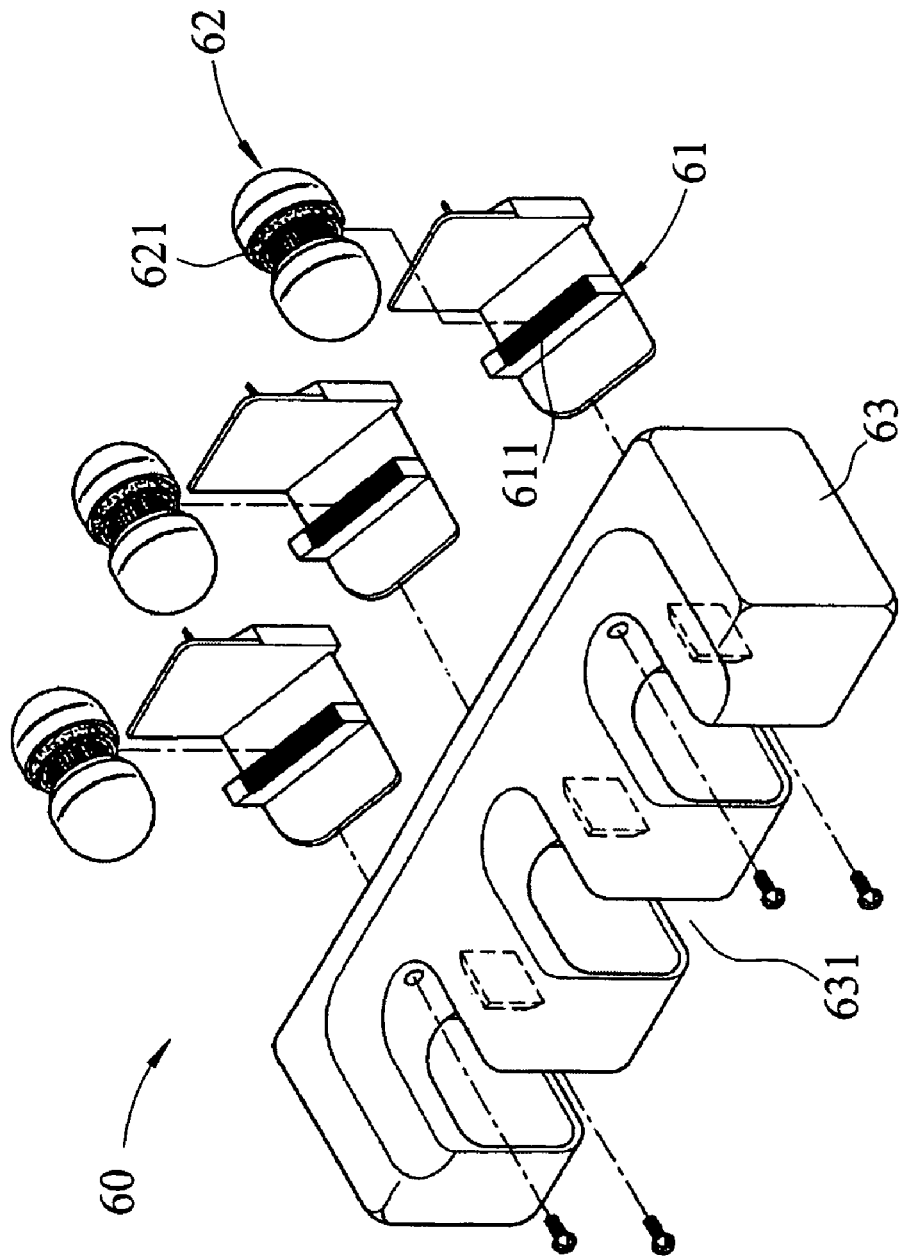
FIG. 12 is an exploded view to show a first conventional holding device.
Figure 13:
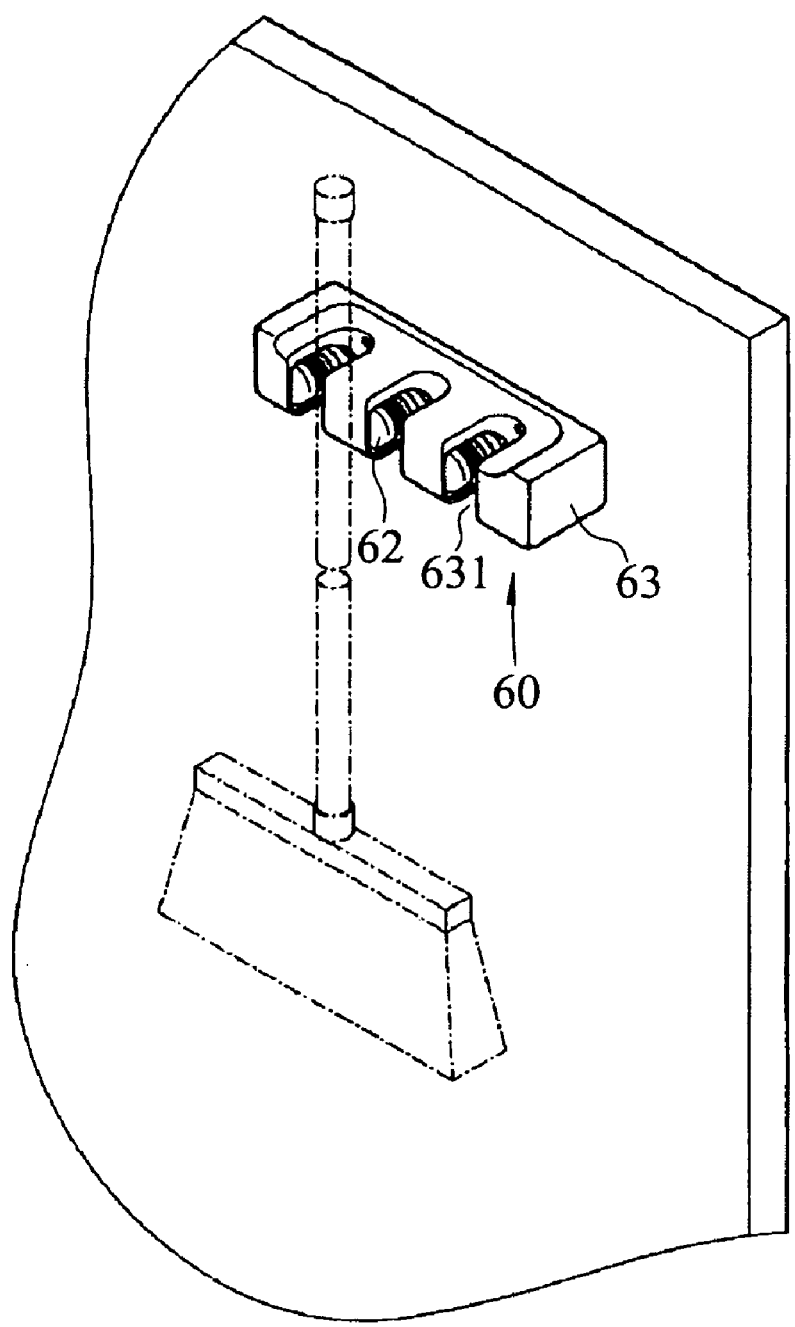
FIG. 13 shows a tool is clamped by the first conventional holding device.
Figure 14:
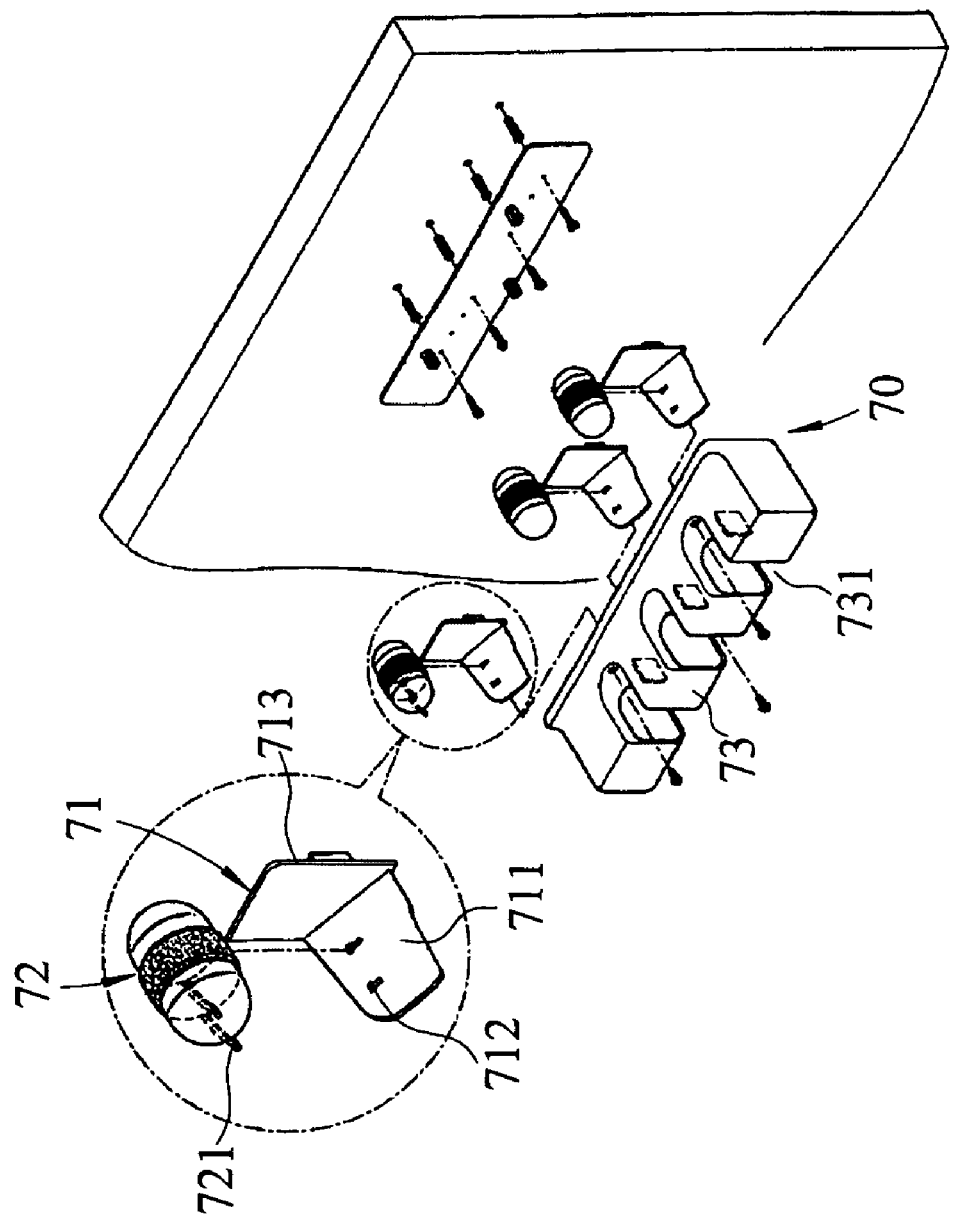
FIG. 14 is an exploded view to show a second conventional holding device.

FIGS. 10 and 11 show that the number of the protrusions can be more than two, wherein the other inside opposite to the inside having the hole 13 of the protrusion has a recess and the cover 50 has a protruding portion 510 on a side thereof, so that the protruding portion 510 is engaged with the recess.

While we have shown and described the embodiment in accordance with the present invention, it should be clear to those skilled in the art that further embodiments may be made without departing from the scope of the present invention.

What is claimed is:

1. A holding device comprising:
   a base with a first protrusion and a second protrusion and a receiving space defined between the protrusions, the first protrusion having a hole defined in an inside thereof and a clamping member movably received in the first protrusion, the clamping member having a frictional portion movably extending through the hole and protruding into the receiving space;
   a biasing device connected between the clamping member and the first protrusion so that the clamping member is biased toward the hole when not in use, and a positioning device adapted to be fixed on a wall and the base being fixed on the positioning device;
   wherein the clamping member has an eccentric shaft which has a first end connected to a protrusion on an upright inner end of the first protrusion and a second end of the eccentric shaft has a slit, the biasing device being a torsion spring having a first end thereof connected to the slit and a second end of the torsion spring being connected to a positioning stub on the first protrusion.

2. The holding device as claimed in claim 1, wherein the positioning stub is integral with a plate which has a notch defined in an end thereof so that the second end of the torsion spring is engaged with the notch before being connected with the stub.

3. The holding device as claimed in claim 1, wherein the clamping member has a friction band wrapped to the friction portion thereof.

4. The holding device as claimed in claim 1, wherein a friction plate is connected to an inside of the second protrusion and faces the clamping member.

5. The holding device as claimed in claim 1, wherein a ridge extends from a horizontal inside of the first protrusion and a hook is connected to the inside of the first protrusion, the hook is located closes to an end of a periphery of the hole, a cover is inserted into the first protrusion from an open rear end of the base, the cover has an engaging part on a lower end thereof so as to be engaged with the ridge, a projection extends from a side of the cover so as to be hooked with the hook.

6. The holding device as claimed in claim 5, wherein the other inside opposite to the inside having the hole has a recess and the cover has a protruding portion on a side thereof, the protruding portion is engaged with the recess.

7. The holding device as claimed in claim 1 further comprising two guide tubes located in an open rear end of the base and bolts extending through the guide tubes and being connected to the positioning device.

8. The holding device as claimed in claim 7, wherein the positioning device includes a positioning board which is adapted to be fixed on the wall by two screws and two threaded reception tubes extend from the positioning board, the guide tubes are in alignment with the reception tubes and the bolts are connected to the reception tubes.

9. The holding device as claimed in claim 7, wherein the positioning device includes two connection plates connected to the two guide tubes by the bolts, two reception frames are adapted to be fixed on the wall and each reception frame has a U-shaped receiving space in which respective one of the two connection plates is engaged.

* * * * *